US011969668B2

(12) United States Patent
Schneider

(10) Patent No.: US 11,969,668 B2
(45) Date of Patent: Apr. 30, 2024

(54) APPARATUS, SYSTEMS, AND METHODS FOR EXTRACTING ORGANIC COMPOUNDS

(71) Applicant: John R. Schneider, Delaware, OH (US)

(72) Inventor: John R. Schneider, Delaware, OH (US)

( * ) Notice: Subject to any disclaimer, the term of this patent is extended or adjusted under 35 U.S.C. 154(b) by 85 days.

(21) Appl. No.: 17/674,491

(22) Filed: Feb. 17, 2022

(65) Prior Publication Data

US 2022/0266167 A1 Aug. 25, 2022

Related U.S. Application Data

(60) Provisional application No. 63/151,381, filed on Feb. 19, 2021.

(51) Int. Cl.
*B01D 11/02* (2006.01)
*F25D 17/02* (2006.01)
*F25D 25/02* (2006.01)

(52) U.S. Cl.
CPC ...... *B01D 11/0296* (2013.01); *B01D 11/0207* (2013.01); *B01D 11/028* (2013.01); *B01D 11/0288* (2013.01); *F25D 17/02* (2013.01); *F25D 25/02* (2013.01)

(58) Field of Classification Search
CPC ............ B01D 11/0296; B01D 11/0207; B01D 11/028; B01D 11/0288; B01D 11/0492; B01D 11/02; B01D 11/0292; B01D 21/009; F25D 11/00; F25D 17/02; F25D 11/04; F25D 13/00; F25D 15/00; F25D 23/12; F25D 25/02; F25D 25/028; F25D 29/001; F25D 31/002; F25D 31/006; F25B 15/00; F25B 15/008; F25B 15/14; F25B 17/02; F25B 41/40; F16L 9/18; F16L 9/19
USPC .................................. 138/111.114, 111, 114
See application file for complete search history.

(56) References Cited

U.S. PATENT DOCUMENTS

| 1,463,154 | A | * | 7/1923 | Cummins | .......... B01D 11/0296 |
| | | | | | 202/172 |
| 2,152,665 | A | * | 4/1939 | Rosenthal | ................ C11B 1/10 |
| | | | | | 554/20 |
| 2012/0060541 | A1 | * | 3/2012 | Hunt | .................... A01N 1/0236 |
| | | | | | 312/107 |

(Continued)

OTHER PUBLICATIONS

Translation of Hu Patent Publication CN 209840772, published Dec. 2019. (Year: 2019).*

*Primary Examiner* — Joseph W Drodge
(74) *Attorney, Agent, or Firm* — Standley Law Group LLP; Kenny W. Pung; Jeffrey C. Norris

(57) ABSTRACT

An extraction system that includes a cooling chamber and a closed extraction loop. The cooling chamber includes a body, a lid, and an interior defined therebetween, as well as a channel extending through the cooling chamber body from the interior to the exterior. The closed extraction loop includes a first extraction loop component located within the interior of the cooling chamber and a second extraction loop component located exterior to the cooling chamber. A fluid line is incorporated into the channel defined in the cooling chamber body and is fluidly connected to the first extraction loop component and the second extraction loop component, thereby enabling fluid transfer between them. Also disclosed are extraction system that include cooling chambers featuring a rack apparatus and an adapted freezer.

16 Claims, 16 Drawing Sheets

(56) References Cited

U.S. PATENT DOCUMENTS

| | | | |
|---|---|---|---|
| 2013/0151004 A1* | 6/2013 | Winter | G01N 1/42 |
| | | | 700/218 |
| 2015/0360144 A1* | 12/2015 | Wasserman | B01D 11/0253 |
| | | | 202/168 |
| 2016/0245588 A1* | 8/2016 | Baugh | F26B 9/06 |
| 2016/0250564 A1* | 9/2016 | Thomas | B01D 11/0288 |
| | | | 554/8 |
| 2017/0043276 A1* | 2/2017 | Tennant | C07D 311/80 |
| 2021/0140698 A1* | 5/2021 | Ellis | F25D 3/10 |
| 2021/0269737 A1* | 9/2021 | Wirtz | B01D 11/0288 |
| 2021/0356178 A1* | 11/2021 | Novek | F28D 20/0034 |
| 2022/0023772 A1* | 1/2022 | Bothell | B01D 11/0284 |
| 2022/0249977 A1* | 8/2022 | Seabrook | B01D 11/0288 |

* cited by examiner

APPARATUS, SYSTEMS, AND METHODS FOR EXTRACTING ORGANIC COMPOUNDS

CROSS-REFERENCE TO RELATED APPLICATIONS

This application is a nonprovisional patent application that makes a priority claim to U.S. Provisional Application No. 63/151,381, filed Feb. 19, 2021.

TECHNICAL FIELD

Exemplary embodiments relate generally to apparatus, systems, and methods for extracting organic compounds from plant matter. In particular, embodiments relate to rack apparatus for converting conventional freezers into cooling chambers for extraction system components; extraction systems that utilize said cooling chambers; and extraction methods that may be performed by using said extraction systems.

BACKGROUND

Recent developments in the field of consumable *cannabis* products have largely been focused on extracting organic compounds from *cannabis* plant matter (such as cannabinoids, terpenoids, and phenolic compounds) and infusing them and/or converting them into other consumable products of higher purity. This can include, for example, edible products, vape-able oils, and smoke-able concentrates.

Extraction of said organic compounds may typically be achieved by way of solvent extraction processes. For example, supercritical $CO_2$ extractions and hydrocarbon extractions are known to be suitable for such applications. While different in their own ways, these extraction processes commonly rely on liquid or supercritical solvents to extract the desired compounds (herein referred to as "extract") from the parent (i.e., plant) material. Upon doing so, a phase transition may be initiated in the solvent to separate the solvent from the extract.

As those skilled in the art will appreciate, however, these extraction systems are not without their faults. For one, processing conditions can often be very capital intensive given that certain solvent extraction system components require extremely cold temperatures to operate (e.g., clarification vessels) or otherwise for optimization (e.g., extraction vessels). These cold temperature requirements have typically necessitated the use of expensive cooling equipment such as laboratory chillers or consumable cooling agents like dry ice. Further, the solvents used in these extraction systems tend to be hazardous and/or potentially explosive (particularly hydrocarbon solvents) and are therefore dangerous to work with. Injuries have been known to occur during the operation solvent extraction processes. Thus, for at least these reasons, it is contemplated that a safer solvent extraction system featuring a more cost-effective cooling means would be desired.

SUMMARY OF THE INVENTION

Disclosed are extraction systems that include a cooling chamber and an extraction loop.

In one embodiment, the extraction system includes a cooling chamber that includes a body, a lid, and an interior defined therebetween. The cooling chamber body defines a channel that extends from the interior of the cooling chamber to the exterior of the cooling chamber. The extraction system also includes a fluid line incorporated into the channel defined in the cooling chamber body. The extraction loop of this embodiment includes a first extraction loop component located within the interior of the cooling chamber and a second extraction loop component located exterior to the cooling chamber. The fluid line is fluidly connected to the first extraction loop component and the second extraction loop component and enables fluid transfer between them.

In another embodiment, the extraction system includes a cooling chamber that includes a freezer and a rack apparatus. The freezer includes a body, a lid, and an interior spaced defined therebetween. The rack apparatus is inserted into the interior space of the freezer. The rack apparatus defines a channel that extends from the interior of the cooling chamber to the exterior of the cooling chamber. A fluid line is incorporated into the channel defined in the rack apparatus. The closed extraction loop includes a first extraction loop component located within the interior of the cooling chamber and a second extraction loop component located exterior to the cooling chamber. The fluid line is fluidly connected to the first extraction loop component and the second extraction loop component and enables fluid transfer between them.

In yet another embodiment, the extraction system includes a cooling chamber that includes a body, a lid, and an interior defined therebetween. The cooling chamber body defines a channel that extends from the interior of the cooling chamber to the exterior of the cooling chamber. A fluid line is incorporated into the channel defined in the cooling chamber body. The extraction system also includes a closed extraction loop that includes a plurality of extraction loop components. The plurality of extraction loop components includes an extraction vessel located within the interior of the cooling chamber; a clarification vessel located within the interior of the cooling chamber; and a purge vessel located exterior to the cooling chamber. Extraction loop component is in fluid communication with one another. The fluid line is fluidly connected to the clarification vessel and the purge vessel and enables fluid transfer between them.

Other examples of the disclosed extraction system will become apparent from the following detailed description, the accompanying drawings and the appended claims.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
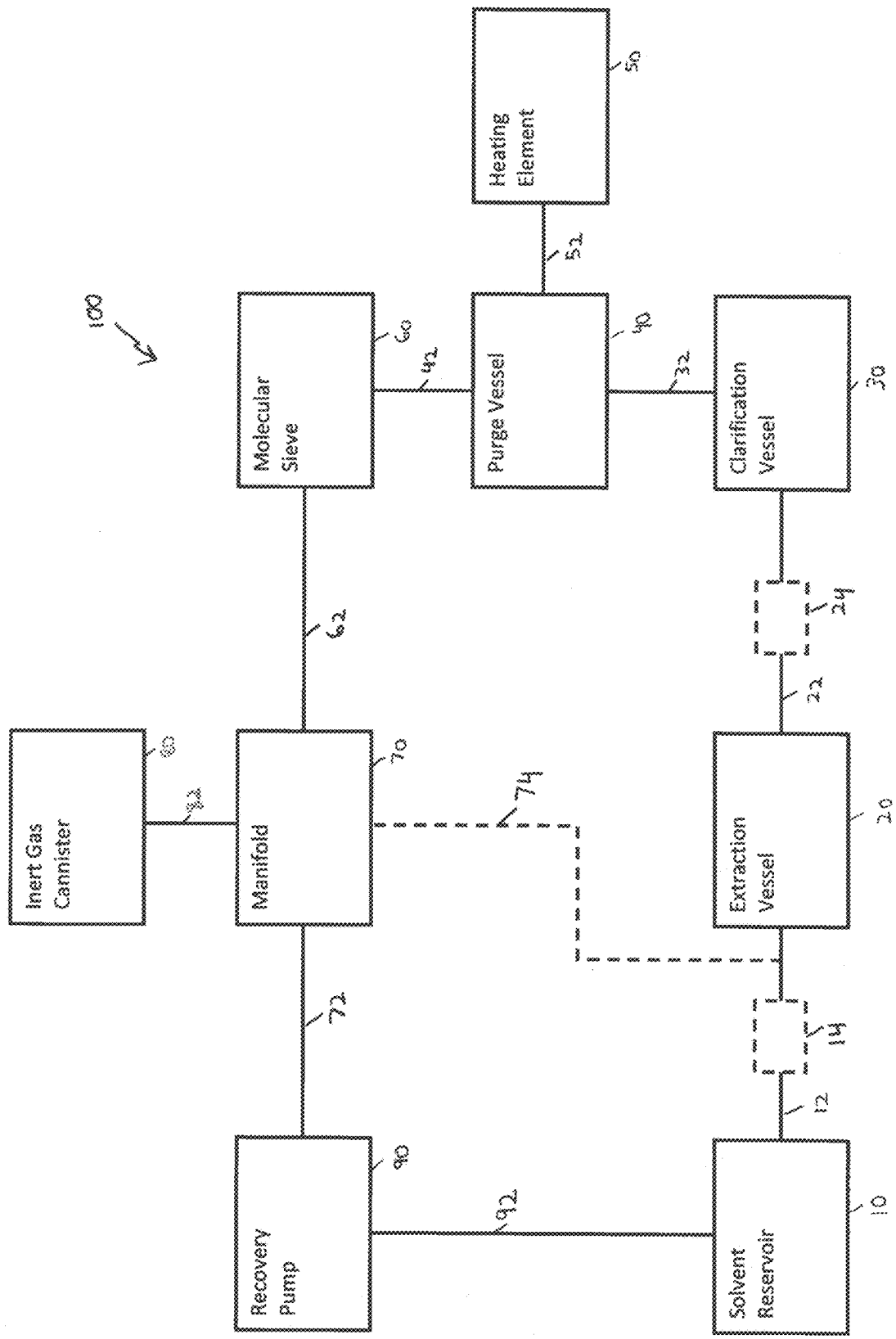
FIG. 1 is a schematic illustration of a closed extraction loop.

Referring to FIG. 1, depicted is a schematic illustration of a closed extraction loop 100. This extraction loop 100 is configured for solid-liquid extraction (i.e., leeching), and can be used to extract targeted compounds from a carrier material with minimal to no outside air exposure. It is contemplated that this loop 100 may be suitable for extracting organic compounds such as, but not limited to, caffeine from coffee or tea, or cannabinoids from dried *cannabis* plant matter.

The closed extraction loop 100 is a closed environment or path wherein a sequence of extraction processes may occur involving the transfer of fluid from one extraction component to another. Given its cyclical nature, the closed extraction loop can also provide for solvent recovery.

The closed extraction loop 100 includes a plurality of extraction loop components that are fluidly connected by a plurality of fluid lines. Here, the extraction loop components include solvent reservoir 10, extraction vessel 20, clarification vessel 30, purge vessel 40, molecular sieve 60, manifold 70, and recovery pump 90. These extraction loop components can be connected by fluid lines 12, 22, 32, 42, 62, 72, 92 to collectively define the closed path or environment. FIG. 1 also shows heating element 50 and inert gas cannister 80. These components are connected to the extraction loop components 10, 20, 30, 40, 60, 70, 90 to facilitate extraction processes and user control.

In operation, carrier material containing the desired compounds (i.e., solute) may be loaded into the extraction vessel 20. Solvent reservoir 10 feeds solvent into the extraction vessel 20 through fluid line 12 to dissolve the desired compounds, thereby yielding fluid extract. The fluid extract may then be transferred to clarification vessel 30 through fluid line 22 for the separation and removal of undesired compounds. The remaining fluid extract may then be transferred to purge vessel 40 through fluid line 32. Heating element 50 raises the internal temperature of the purge vessel 40 to boil off solvent in the fluid extract (i.e., liquid-to-gas phase transition), thereby leaving behind only the extract in the purge vessel. Gaseous solvent may then be recovered by recovery pump 90 (which dictates the fluid flow rate between components), through fluid lines 62 and 72, while also passing through molecular sieve 60 (to remove moisture) and manifold 70. Recovered solvent can then return to solvent reservoir 10 through fluid line 92, thereby concluding the closed-loop extraction process.

Solvent reservoir 10 can include any vessel capable of connecting to fluid lines, withstanding a pressurized environment, and containing a quantity of solvent (of any variety, e.g., hydrocarbon-based solvents such as butane). In one embodiment, the solvent reservoir 10 may be a cylindrical non-sleeved stainless-steel vessel. Ideal dimensions for this solvent reservoir 10 may be approx. 26 inches in length and approx. 6 inches in diameter. Solvent reservoir 10 can also incorporate fittings, couplings, valves, and the like to facilitate fluid line connection.

Extraction vessel 20 can include any vessel capable of connecting to fluid lines, withstanding a pressurized environment, containing a quantity of carrier material, and receiving a quantity of solvent. In one embodiment, the extraction vessel 20 may be a cylindrical non-sleeved stainless-steel vessel. Ideal dimensions for this extraction vessel 20 may be approx. 26 inches in length and approx. 6 inches in diameter. Extraction vessel 20 can also incorporate fittings, couplings, valves, and the like to facilitate fluid line connection.

Clarification vessel 30 can include any vessel capable of connecting to fluid lines, withstanding a pressurized environment, containing a quantity of filter medium, and receiving a quantity of fluid extract. The filter medium facilitates the separation of undesired compounds from the fluid extract passing through the clarification vessel 30 and retains those undesired compounds within the clarification vessel 30. In one embodiment, the clarification vessel 30 may be a cylindrical non-sleeved stainless-steel vessel. Ideal dimensions for this clarification vessel 30 may be approx. 18 inches in length and approx. 4 inches in diameter. Clarification vessel 30 can also incorporate fittings, couplings, valves, and the like to facilitate fluid line connection.

Purge vessel 40 can include any vessel capable of connecting to fluid lines, withstanding a pressurized environment, and receiving a quantity of fluid extract from the clarification vessel 30 (i.e., clarified fluid extract). Purge vessel 40 can also incorporate fittings, couplings, valves, and the like to facilitate fluid line connection; and filters for further clarifying/filtering the fluid extract (e.g., a 5-micron gasket filter).

Figure 2:
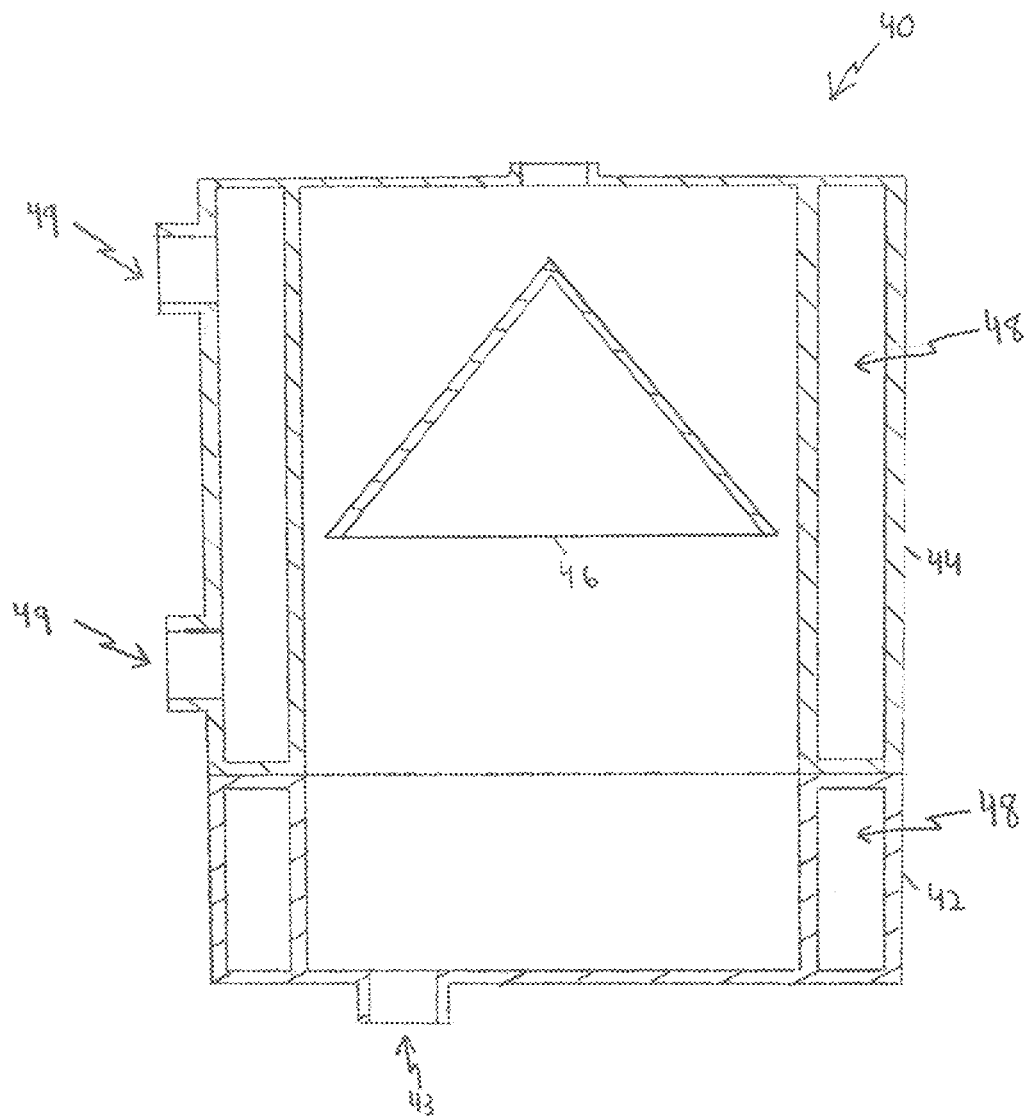
FIG. 2 is a cross-sectional view of one embodiment of a purge vessel.

Referring to FIG. 2, in one embodiment, the purge vessel 40 may include a collection tank 42 and vapor head 44. Vapor head 44 may be disposed above collection tank 42 and utilized to facilitate the liquid-to-gas phase transition of liquid solvent in the incoming fluid extract. As the solvent boils away, the collection tank 42 may collect the remaining extract from below. Collection tank 42 can include ports or openings (e.g., ref. no. 43) for dispensing collected extract.

Vapor head 44 may be a cylindrical sleeved stainless-steel pressure vessel. Ideal, but non-limiting, dimensions for vapor head 44 may be approx. 8 inches in length and approx. 6 inches in diameter. Further, the vapor head 44 may include one or more internal structures that help to spread out the incoming fluid extract, thereby increasing the available surface area for solvent dissipation. Here, the vapor head 44 includes cone 46, which spread out the incoming fluid extract to the interior sides of the vapor head 44.

In one or more embodiments, the collection tank 42 and/or the vapor head 44 may have a double-walled or jacketed design—featuring an inner wall, an outer wall, and an interstitial space 48 defined therebetween. For these purge vessels, a suitable type of heating element 50 may include a thermal fluid heating system that applies heat by circulating heated thermal fluid (e.g., water) through the interstitial space (via ports 49). An example of a thermal fluid heating system that may be suitable here can include 15-kW instant hot water heaters such as the ECO 11 Electric Tankless Water Heater available from Ecosmart US LLC of Miami, Fla. Heat exchangers (e.g., baffles) may also be included in the interstitial space 48 to facilitate heat transfer.

FIG. 2 notwithstanding, it is contemplated that other types of heating elements 50 may also be utilized (either in addition to or as an alternative for the configuration shown in FIG. 2). For example, heating coils may be a suitable option.

Molecular sieve 60 can include any vessel capable of connecting to fluid lines, withstanding a pressurized environment, containing a quantity of drying material, and receiving a quantity of gaseous solvent. The drying material facilitates the removal of water from the solvent passing through the molecular sieve, and retains that water in the molecular sieve 60. The drying material may be a desiccant, such as gel silica beads. In one embodiment, the molecular sieve 60 may be a cylindrical non-sleeved stainless-steel vessel. Ideal dimensions for this molecular sieve 60 may be approx. 18 inches in length and approx. 4 inches in diameter. Molecular sieve 60 can also incorporate fittings, couplings, valves, and the like to facilitate fluid line connection.

Manifold 70 (i.e., manifold gauge set) can include a variety of sensors (e.g., pressure and temperature sensors) and may be utilized to monitor process conditions. For example, it is contemplated that the manifold 70 may be configured to take temperature readings of the recovered solvent before it is returned to the solvent reservoir 10, or internal pressure readings of the extraction loop. This information may be presented to a user through an electronic display provided on the manifold 70 and/or through an external device (e.g., smart phone) operatively connected to the manifold 70 (wired or wirelessly).

Manifold 70 may also facilitate user control over the extraction loop 100. As shown, manifold 70 may be fluidly connected to inert gas cannister 80, via fluid line 82, and may be equipped with one or more additional fluid lines (e.g., ref. no. 74). The additional fluid lines 74 may be connected to any of the fluid lines along the extraction loop (e.g., 12, 22, 32, 42, 62, 72, 92) and utilized to introduce inert gas at specific points. Doing so can help push fluid along the extraction loop, from one extraction loop component to another, and/or equalize drops in internal pressure caused by the transfer of fluid. Internally, the manifold 70 may include any suitable arrangement of fluid distribution components (e.g., pipes, fittings, valves, etc.) capable of distributing fluid as directed by the user (i.e., through a specific additional fluid line). FIG. 1 shows additional fluid line 74 connected to fluid line 12, which would enable manifold 70 to bypass the solvent reservoir 10 and introduce inert gas directly into the extraction vessel 20. Those skilled in the art will appreciate that additional fluid lines 74 can be provided and similarly connected for any of the extraction loop components as needed.

Preferred manifolds include manifolds that feature at least 2 to 4 ports, include an integrated electronic display, can be operatively coupled to accessory sensors, and/or come equipped with wireless capability (e.g., Bluetooth, WIFI, cellular, etc.). Ideally, the manifold would be able to connect to electronic devices, such as personal computers or smartphones, and wirelessly transfer information about the extraction system 100 and/or process to it. One example of such a manifold may be the Fieldpiece 4-Port digital manifold available from Fieldpiece Instruments, Inc., of Orange, California.

Inert gas canister 80 is not limited to any particular size, dimension, or type of inert gas. It is contemplated that 40-lbs nitrogen gas cannisters may be suitable for use with the present invention.

Recovery pump 90 may include a pump having a rating of at least 0.5 cubic feet per minute or higher, but preferably at least 0.7 cubic feet per minute or higher. Ideally, recovery pump 90 may also be sparkless, explosion-proof, and/or pneumatic such that compiles with National Fire Protection Association Standard 70E.

It is intended that the boxes shown in FIG. 1 each represent the notion that "at least one" of that extraction loop component is included. For example, ref. no. 20 represents the notion that at least one extraction vessel is included in the extraction system, and that each extraction vessel is fluidly connected in the same way (i.e., fluidly connected to a solvent reservoir and to a clarification vessel). Similarly, each box can also refer to extraction loop components of differing dimensions (i.e., size and shape) and/or configurations. For example, ref. no. 10 can refer to solvent reservoirs having volume sizes of 20 liters, 60 liters, or 120 liters; and ref. no. 70 can refer to manifolds with any number of input/output ports. Variations such as these will not result in a departure from the scope of the present disclosure.

The fluid lines shown in FIG. 1 (ref. nos. 12, 22, 32, 42, 52, 62, 72, 82, 92) can include hoses, or tubing, combinations thereof, and/or any other suitable means of fluid transfer. These fluid lines can also incorporate valves, fittings, and the like to open, close, or combine fluid lines as desired (e.g., ref. nos. 14 and 24). Examples of valves that may be suitable here includes, but are not limited to, ball valves, butterfly valves, gate valves, globe valves, plug valves, check valves, and the like.

As those skilled in the art will appreciate, optimum processing conditions for extraction processes often required cold temperatures. In the case of cannabinoid extraction, for example, chilling the carrier material before or during solvent extraction may lead to improved yields. Cold temperatures may also be required to enable the solidification of undesired compounds in the fluid extract and retention of those undesired compounds by the filter medium in the clarification vessel 30.

Figure 3:
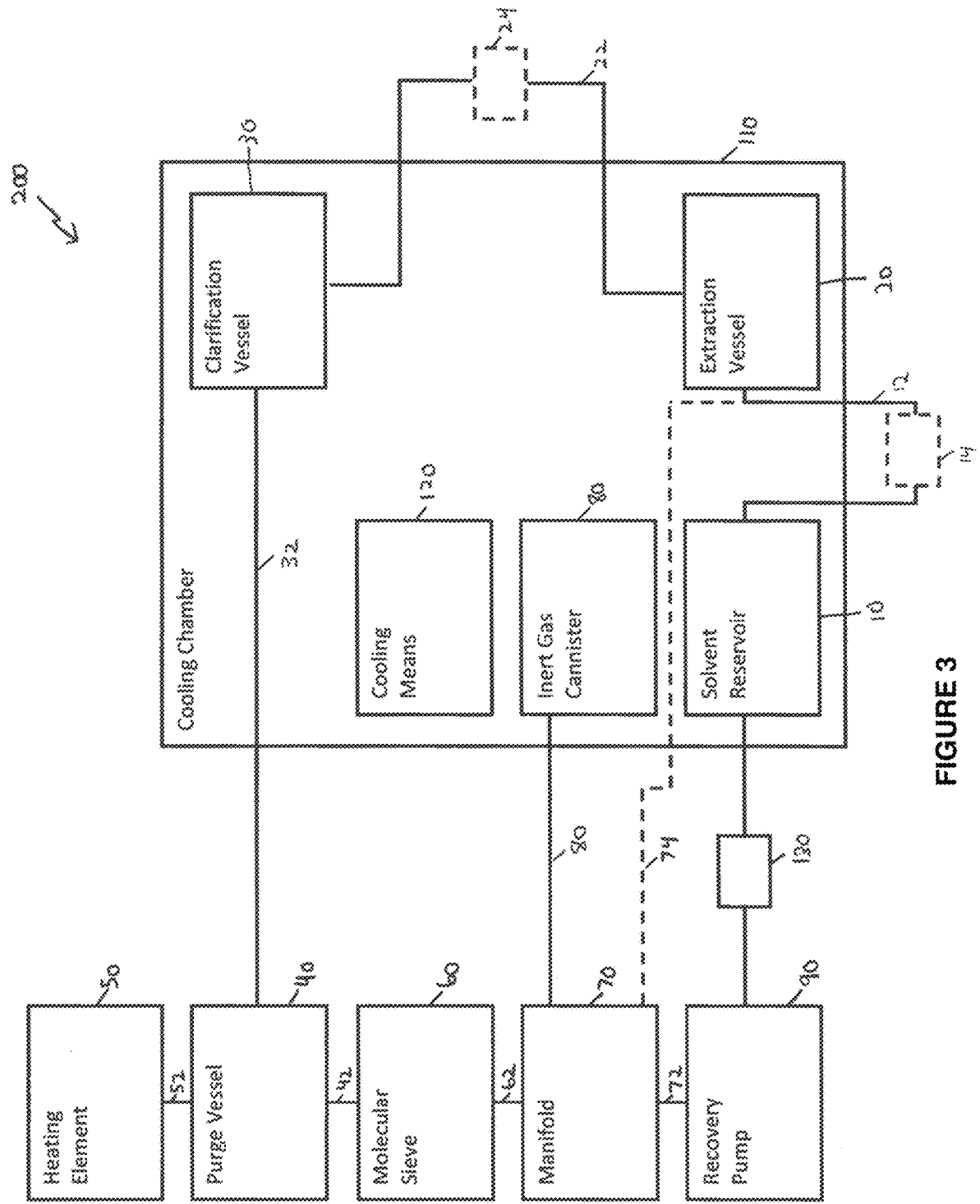
FIG. 3 is a schematic illustration of a closed-loop extraction system that incorporates the closed extraction loop of FIG. 1.

Referring to FIG. 3, depicted is a schematic illustration of an exemplary embodiment of a closed-loop extraction system 200. This extraction system 200 utilizes the extraction loop 100 of FIG. 1 (i.e., the same components and the same arrangement of fluid lines), but further includes cooling chamber 110. Cooling chamber 110 is an insulated enclosure having cooling means 120 that is configured to establish and maintain cold temperatures within the insulated enclosure. One or more extraction loop components may be stored within the cooling chamber 110 to keep those components cold without the need for laboratory chillers or consumable chilling agents.

Cooling means 120 may, but need not, be limited to any particular cooling device or apparatus. In one embodiment, for example, cooling means 120 may include an operative configuration of refrigeration cycle components (e.g., condensing coil, expansion valve, evaporator coil, compressor, etc.) and associated electronic circuitry (e.g., control board, power supply, etc.). Cooling means 120 may be housed within cooling chamber 110 and/or integrated into it. Alternatively, it is also contemplated that cooling means 120, or parts of cooling means 120 (e.g., compressor, control board, etc.), can be located outside of cooling chamber 110 to isolate those components. It is contemplated that doing may be necessary if, for example, an entirely sparkless environment is required for the closed-loop extraction system 200. Preferably, the cooling means 120 may be configured to maintain internal temperatures of −45° F. or colder.

In one or more embodiments, heating element 50 may be adapted from cooling chamber 110 refrigeration cycle components. For example, it is contemplated that refrigerant fluid from a compressor may be routed into the interstitial space 48 of the purge vessel 40 of FIG. 2 and then routed back into the refrigeration cycle. As those skilled in the art will appreciate, this refrigerant fluid will be heated from the compressor and needs to dissipate heat before entering the evaporator. Therefore, it is contemplated that this heat can be utilized to dissipate solvent in the purge vessel 40. Doing so may also result in improved efficiency of the refrigeration cycle components (and the cooling chamber 110 overall) which may translate into energy savings.

In one or more embodiments, heating element 50 may be adapted from fluid line 92. As those skilled in the art will appreciate, gaseous solvent recovered by and passing through the recovery pump 90 may exhibit elevated temperatures. Without being bound by any particular theory, it is believed that normal operation of the recovery pump generates internal heat that is subsequently transferred to the recovered solvent passing through it. It is also believed that the recovery pump 90 may effectively serve as a compressor in a refrigeration cycle, with the recovered solvent being heated and compressed like refrigerant fluid. It is contemplated that rather than routing this heated recovered solvent directly into the cooling chamber 110, fluid line 92 may first be operatively connected to the purge vessel 40 and utilized to heat it (thereby dissipating heat from the recovered solvent) before then routing the recovered solvent into the cooling chamber 110. Operatively connecting fluid line 92 to the purge vessel 40 may entail, for example, coiling the fluid line 92 around the exterior of the purge vessel 40, integrating fluid line 92 into the walls of the purge vessel 40, and/or the like.

In the embodiment shown, the solvent reservoir 10, the extraction vessel 20, the clarification vessel 30, and the inert gas cannister 80 are stored in the cooling chamber 100. This arrangement ensures that the extraction vessel 20 and the clarification vessel 30 are consistently maintained at cold temperatures. Further, since the cooling chamber 100 is an enclosed space and the entire internal environment is cooled, as opposed to localized cooling via a laboratory chiller, it is contemplated that solvent leaks, should they occur, may pool at the bottom rather than dissipating as a gas (which may be flammable).

Other embodiments of the extraction system 200 may feature different arrangements of extraction loop components within and outside of the cooling chamber 100. For example, it is contemplated that the inert gas cannister 80 or the extraction vessel 20 may be located outside of the cooling chamber 110. Alternatively, it is contemplated that the molecular sieve 60 may be located within the cooling chamber 110. Variations such as these will not result in a departure from the scope of the present disclosure.

If needed, mounting hardware such as racks, equipment stands, straps, fasteners, and the like may also be provided in the cooling chamber 110 to support the extraction loop components stored therein.

The extraction system of FIG. 3 also includes thermostat 130. As used herein, the term "thermostat" refers to a regulating device that senses the temperature of a physical system and performs actions so that the system's temperature is maintained at or near a desired setpoint. Here, thermostat 130 may be integrated into the extraction cycle before the solvent reservoir 10 (e.g., into fluid line 92) and utilized to regulate the flow of recovered solvent from the recovery pump 90. Ideally, thermostat 130 should be configured to stop or limit the flow of solvent into the solvent reservoir 10 if the recovered solvent exceeds an acceptable temperature. In a preferred embodiment, the thermostat may be configured to maintain an internal temperature within the cooling chamber of −45° F. or colder. This prevents excess thermal mass from entering the cooling chamber 110 and minimizes the energy expenditure by the cooling means 120 to cool the internal environment. It is contemplated that expansion valves are one type of thermostat that may be suitable for use here.

The extraction system of FIG. 3 may also include an orifice plate insertable into a fluid line to limit or control the flow of fluid into the cooling chamber. The orifice plate may be included either in addition to, or as an alternative for, thermostat 130. The orifice plate opening may be varied as needed or desired without departing from the scope of the present invention.

Figure 4:
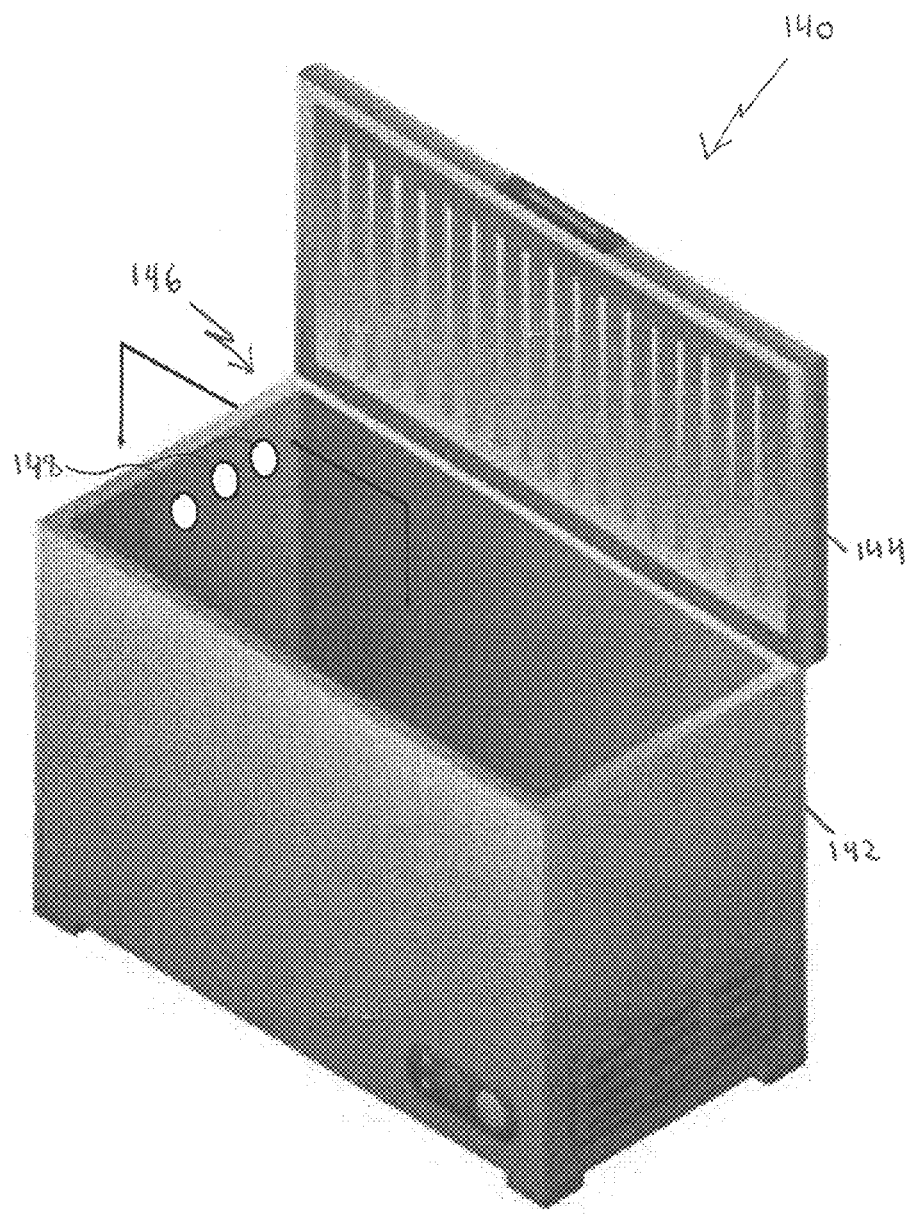
FIG. 4 is a side perspective view of a first embodiment of a cooling chamber.

Referring to FIG. 4, the present disclosure provides a first exemplary embodiment of a cooling chamber 140. This embodiment 140 is representative of the type of cooling chamber that may be utilized with the system of FIG. 3. As shown, this cooling chamber 140 is a chest-type enclosure having body 142 and lid 144, with interior space 146 defined therebetween. Extraction loop components may be stored within the cooling chamber 140 by opening the lid and inserting them into the interior space 146.

Figure 5:
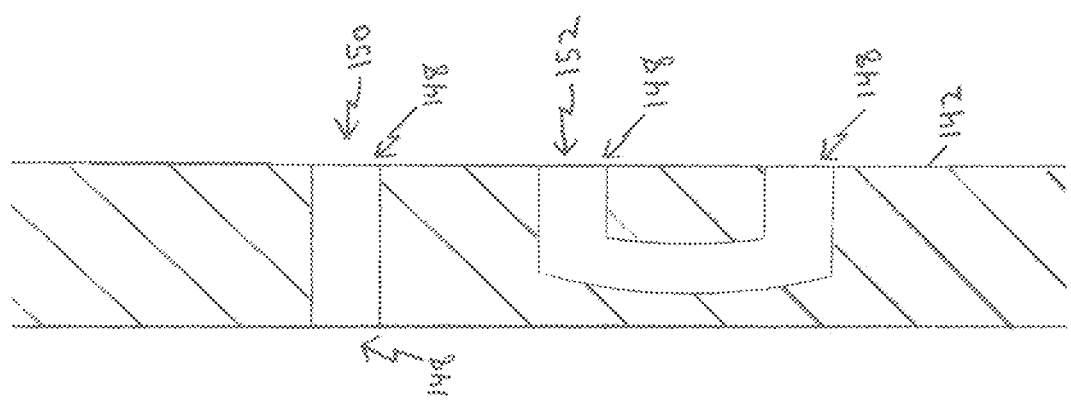
FIG. 5 is a cross-sectional view of a portion of the cooling chamber of FIG. 4 showing two channels.

Cooling chamber body 142 also defines a number of openings 148 (three being shown) that open into channels defined therein. FIG. 5 depicts two types of channels that can be defined. Channel 150 extends across the cooling chamber body 142 with openings 148 disposed on the interior and exterior sides thereof. It is contemplated that a fluid line may be incorporated into this channel 150 and utilized to transfer liquid between extraction loop components within the cooling camber 140 and those located outside of it (in either direction) (e.g., transferring fluid extract from the clarification vessel 30 to the purge vessel 40). In contrast, channel 152 extends through the cooling chamber body 142 with openings 148 disposed on interior side. It is contemplated that a fluid line may be incorporated into channel 152 and utilized to transfer liquid between extraction loop components located within the cooling chamber 140 (e.g., transferring solvent from the solvent reservoir 10 to the extraction vessel 20). By incorporating fluid lines into the cooling chamber 140, via channels such as channels 150 and 152, it is possible to have a fluidly continuous extraction loop even though some of the extraction loop components (e.g., solvent vessel 10, extraction vessel 20, clarification vessel 30, etc.) are enclosed within the cooling chamber 140. Further, incorporating fluid lines may also enable the extraction process to be performed without having to open the cooling chamber lid 144.

Those skilled in the art will appreciate that the channels shown in FIG. 5 are only meant to be demonstrative and that an actual configuration of channels defined in a given embodiment of the cooling chamber may feature, for example, multiple channels like the channels shown in FIG. 5, and/or channels that are some combination of the channels shown in FIG. 5, and/or channels with more than two openings. Variations such as these will not result in a departure from the scope of the present disclosure.

Figure 6:
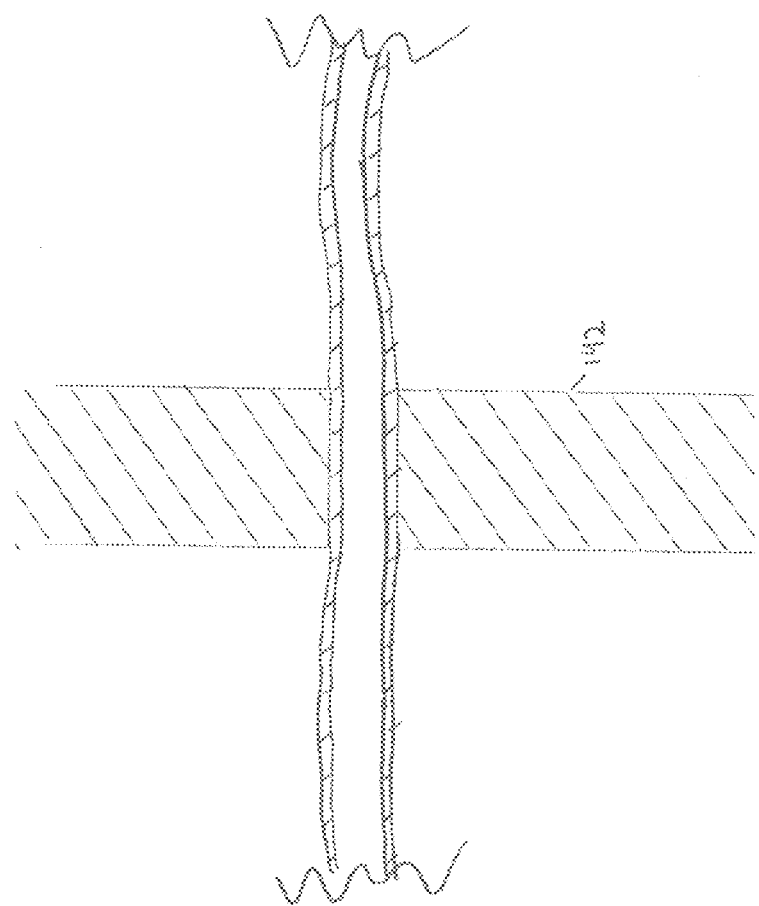
FIG. 6 is a cross-sectional view of a portion of a cooling chamber showing a first method of incorporating a fluid line into a channel.
Figure 7:
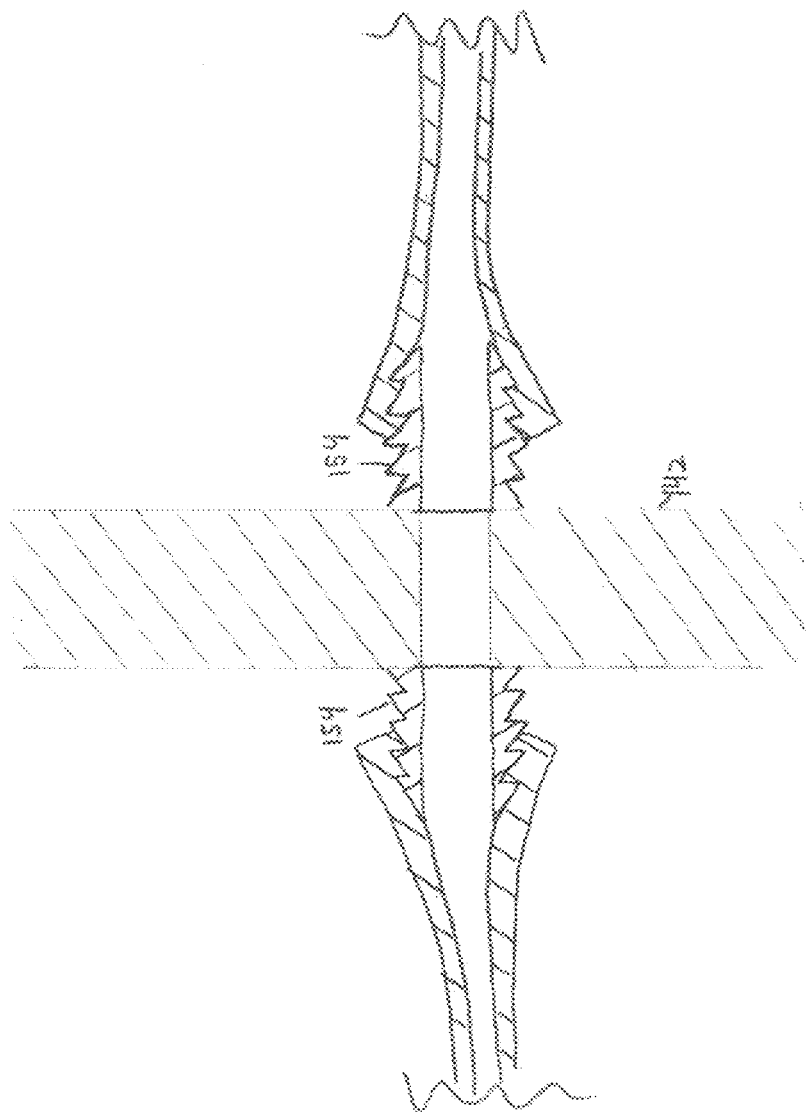
FIG. 7 is a cross-sectional view of a portion of a cooling chamber showing a second method of incorporating a fluid line into a channel.

Incorporating fluid lines into a channel can entail inserting/passing hoses, tubing, and/or the like through the channel (FIG. 6). Additionally, or alternatively, incorporating fluid lines can entail connecting hoses, tubing, and/or the like to a channel such that the channel becomes part of the fluid line itself (FIG. 7). Coupling features can be included to facilitate fluid line connection (e.g., hose barbs 154). Another type of coupling feature that may be suitable includes food grade stainless steel compression fittings such as Yor-lok fittings available from McMaster-Carr of Elmhurst, Illinois. Swagelok Co. of Solon, Ohio, and Superlok USA Inc. of Ventura, California, also make fittings that may be suitable.

Figure 8:
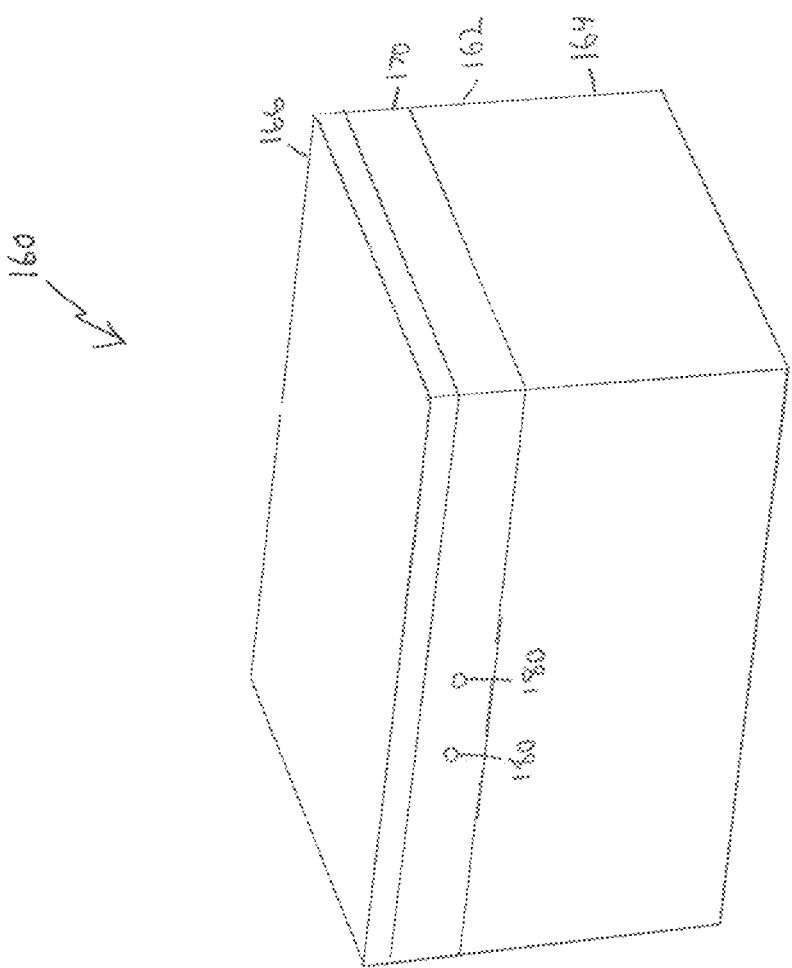
FIG. 8 is a front perspective view of a second embodiment of a cooling chamber.
Figure 9:
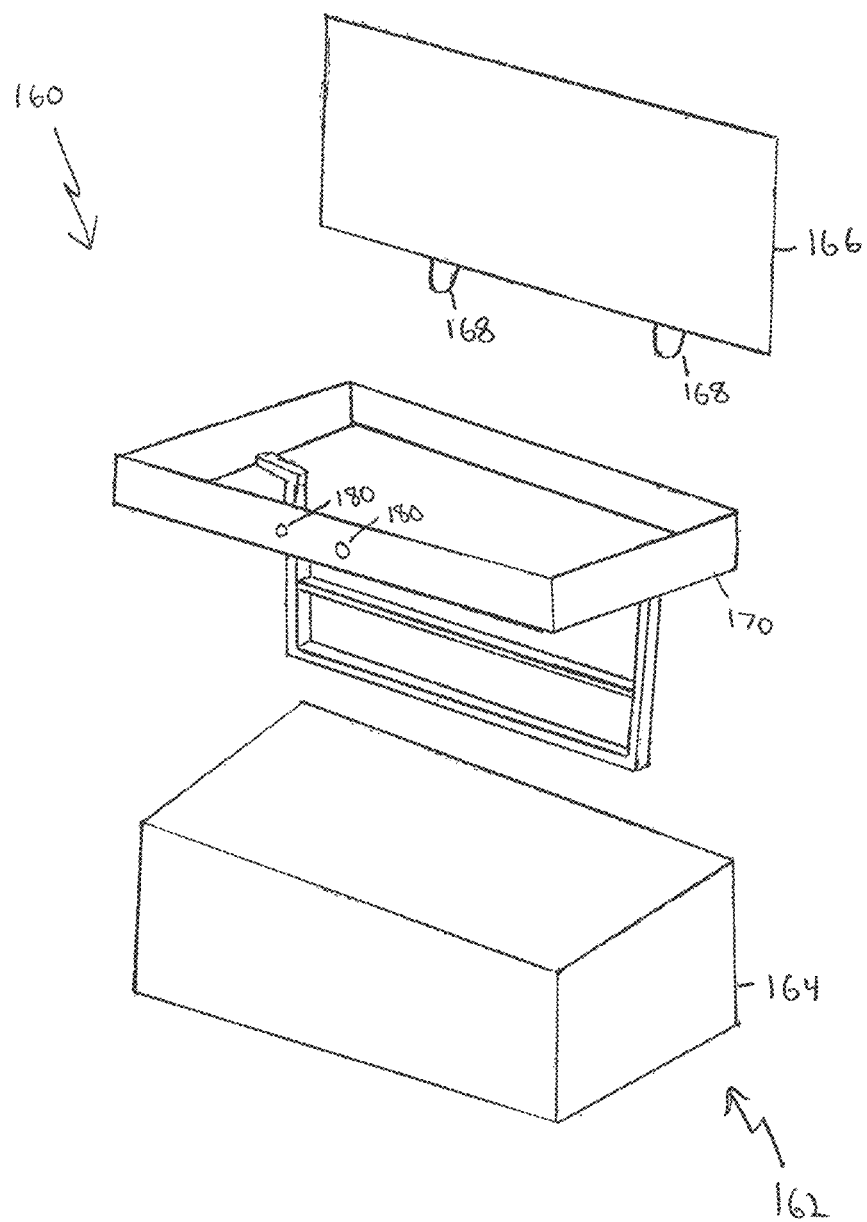
FIG. 9 is an exploded front perspective view of the cooling chamber of FIG. 8.

Referring to FIGS. 8 and 9, the present disclosure provides a second exemplary embodiment of a cooling chamber 160. This cooling chamber 160 includes freezer 162 and rack apparatus 170. Freezer 162 includes body 164 and lid 166, and may be equipped with a cooling means for establishing and maintaining a cold internal environment. It is contemplated that freezer 162 may be a conventional 5 ft$^3$ chest freezer. Freezer 162 may be converted into a cooling chamber 160 (and thereby suitable for use with the extraction system of FIG. 3) by detaching lid 166 from body 164, inserting the rack apparatus 170 into body 164, and optionally attaching the lid 166 onto the rack apparatus 170 (e.g., via hinges 168). With this arrangement, the rack apparatus 170 will rest on the upper lip of the freezer body 164. The combination of the rack apparatus 170 and the body 164 of the freezer 162 comprises the cooling chamber 160 body, and lid 166 can be utilized as the cooling chamber 160 lid. Further, openings 180 and channels defined in the rack apparatus 170 may incorporate fluid lines and provide for the transfer of fluid through or across the rack apparatus.

Figure 10:
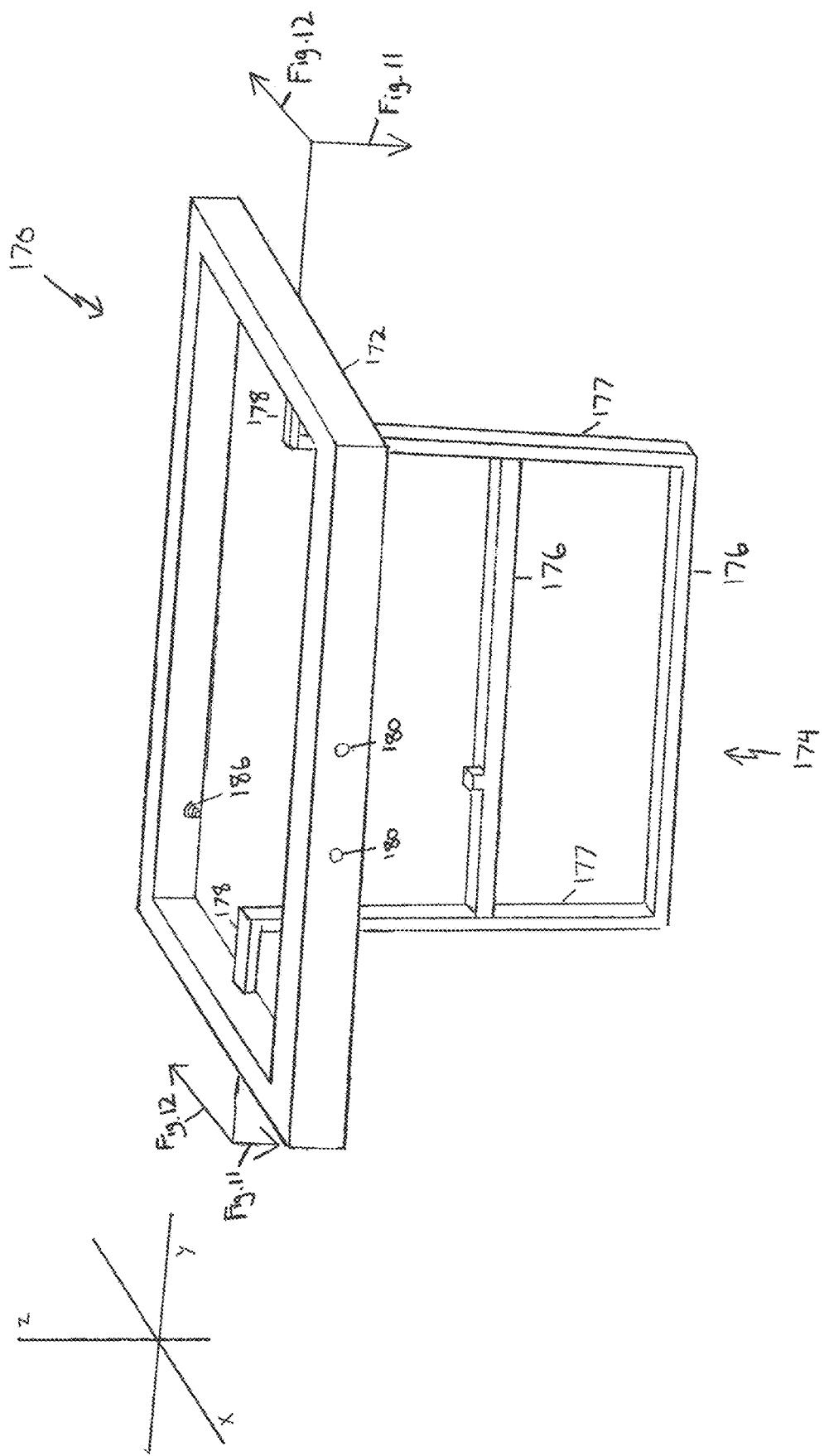
FIG. 10 is a front perspective view of an exemplary embodiment of a rack apparatus.

Referring to FIG. 10, the rack apparatus includes upper rim 172 and rack portion 174. Upper rim 172 is a structure that is intended to rest on the upper lip of freezer body 162 and support rack portion 174 from above. Upper rim 172 should generally match the upper lip of the freezer body 164 in length, width, and overall shape (e.g., rectangular). Ideally, when the cooling chamber 160 is assembled there should be no openings for cold air to escape between either of the upper rim 172 and freezer body 164, or the upper rim 172 and the freezer lid 166. If needed, sealant may also be used (such as food grade silicone caulk or magnetic/plastic freezer seals) to create an airtight seal therebetween.

Figure 13:
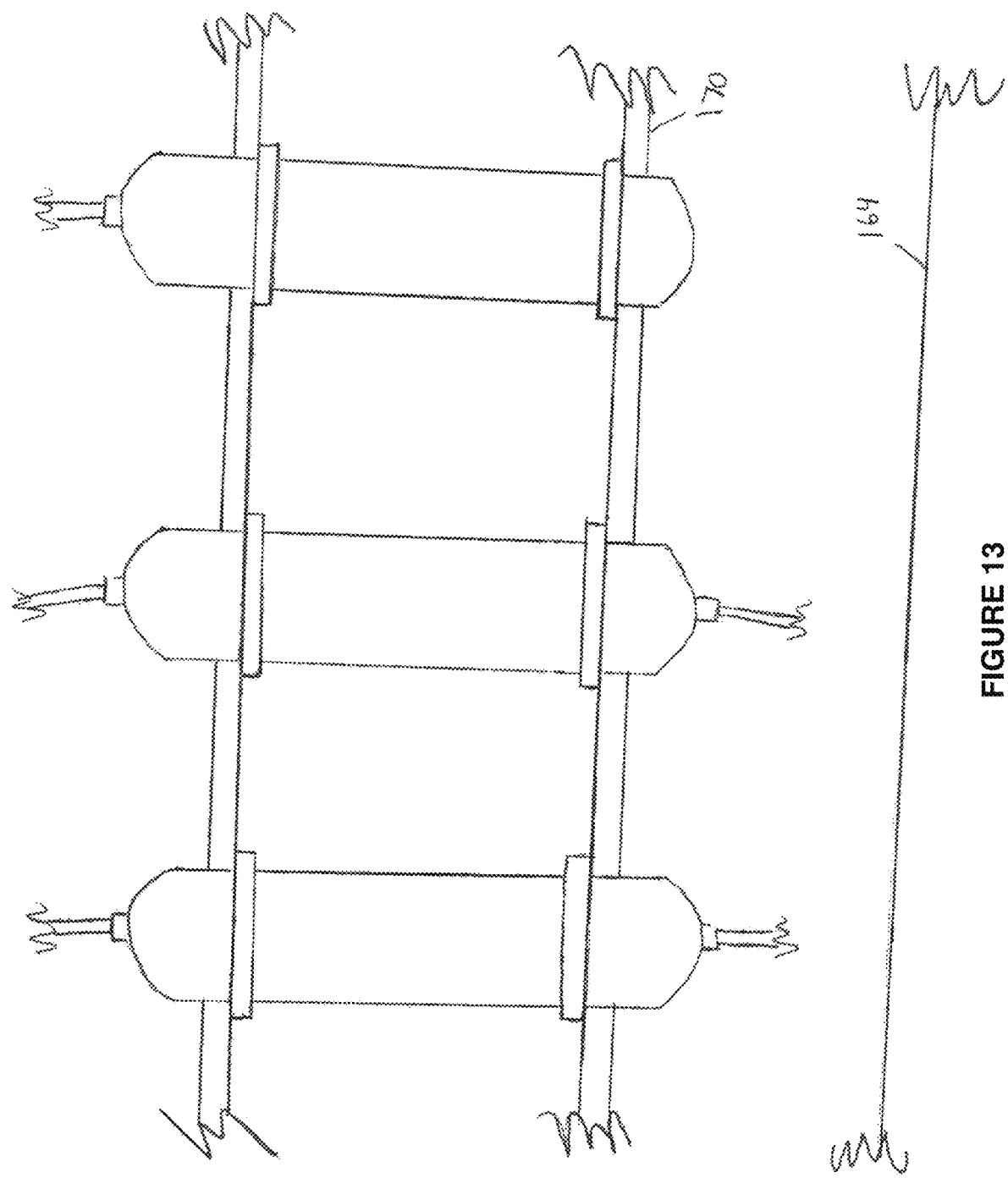
FIG. 13 is a front view of a rack portion of a rack apparatus with extraction system components attached.

Rack portion 174 is a structure that extraction loop components can be attached to and supported by while in the cooling chamber 160. By attaching extraction loop components to rack portion 174, it is possible to maneuver all those components into or out of the freezer body 164 simultaneously. Further, as shown in FIG. 13, the rack portion 174 may be configured such that the extraction loop components, when attached, are elevated above the floor of the freezer body 164. This prevents bottom-side ports on extraction loop components from being obstructed, which may otherwise be needed for fluid line connection or general accessibility.

Extraction loop components may be attached by any suitable attachment means such as, for example, conventional tri-clamps for process line equipment, zip ties, welds, scroll bands, slotted tracks and the like.

In the embodiment shown, rack portion 174 includes an arrangement of crossbars 176 and vertical members 177, assembled in a "ladder" formation, and pair of connecting members 178 that attach the vertical members 177 to the upper rim 172. While this embodiment is exemplary, it is not meant to be limiting and those skilled in the art will appreciate that various other arrangements of crossbars 176, vertical members 177, and connecting members 178 may be utilized for the rack portion 174, and that variations such as these will not result in a departure from the scope of the present disclosure.

Figure 11:
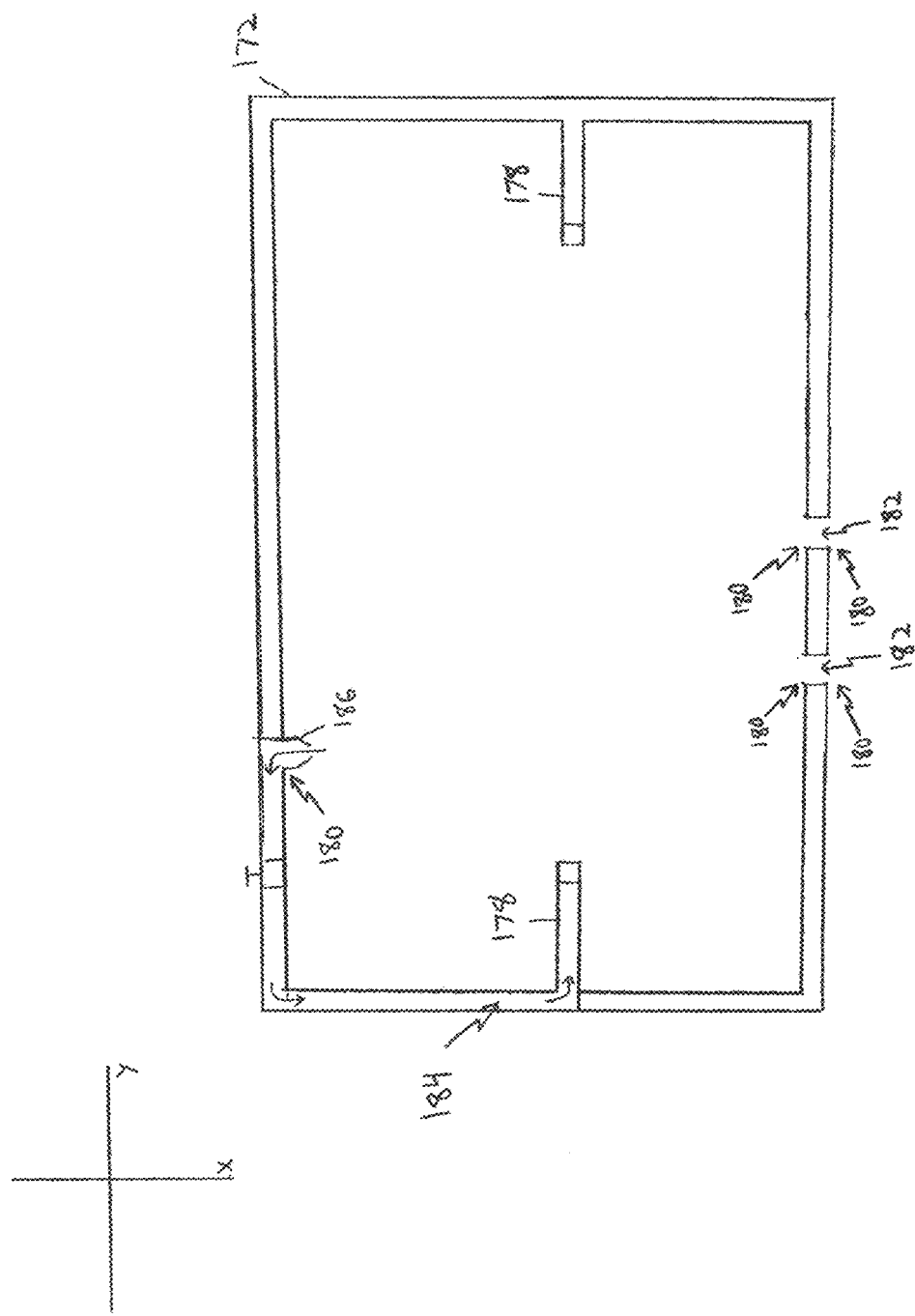
FIG. 11 is a top cross-sectional view of the rack apparatus of FIG. 10.
Figure 12:
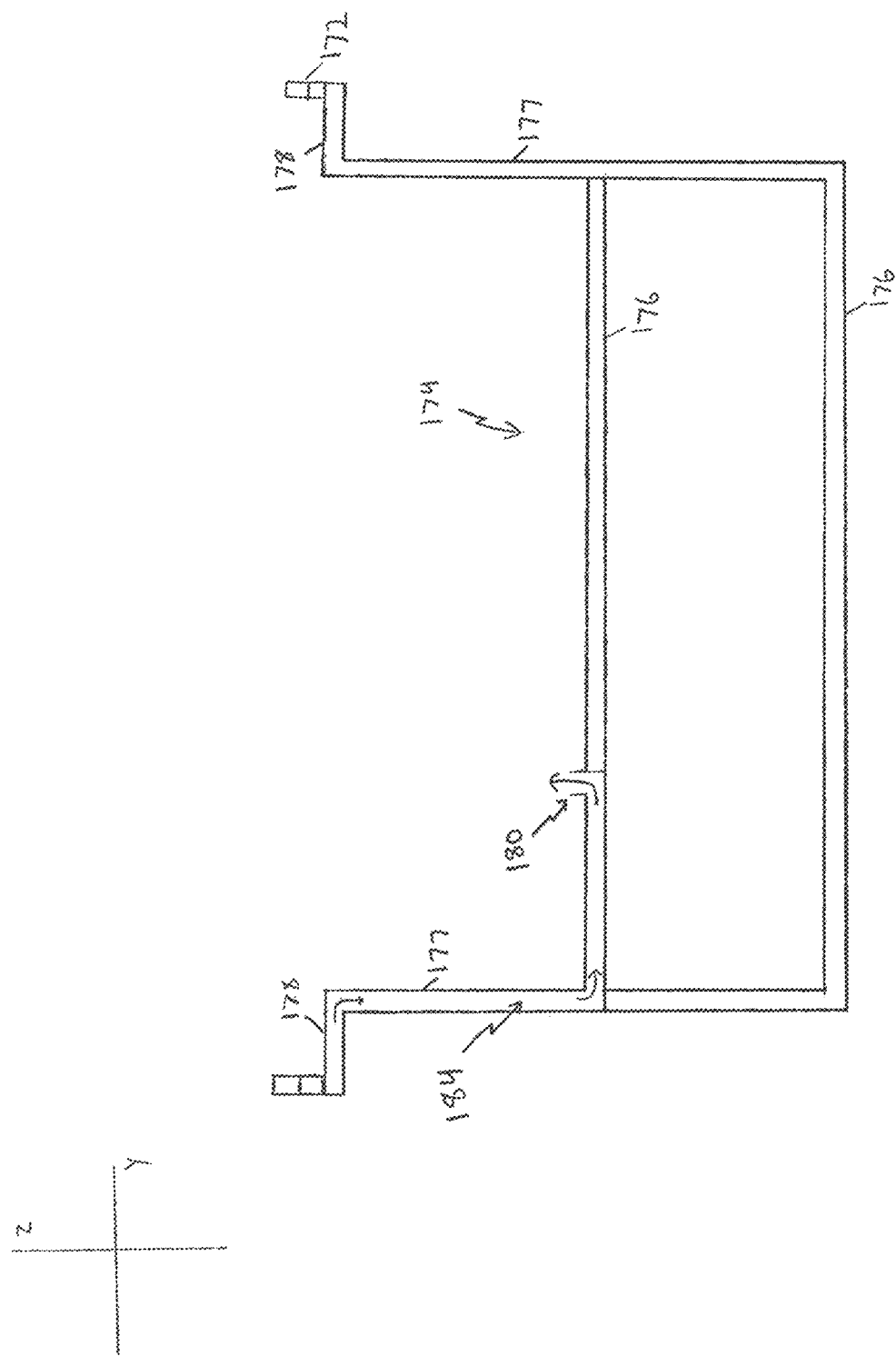
FIG. 12 is a front cross-sectional view of the rack apparatus of FIG. 10.

Referring to FIGS. 11 and 12, it is shown that rack apparatus 170 may define openings 180 and channels like the cooling chamber body 142 of FIG. 4. Channels 182 are similar to channel 150 of FIG. 4 because one of its openings 180 is disposed along the interior and the other is defined along the exterior of the cooling chamber 160. Channel 184 is similar to channel 152 of FIG. 5 because both of its openings 180 are disposed along the interior of the cooling chamber 160. These channels can incorporate fluid lines, as shown in FIGS. 6 and 7, which enable fluid transfer through or across the rack apparatus 170. The rack apparatus 170 can also include coupling features to facilitate fluid line connection (e.g., hose barbs 186). By using rack apparatus 170, it is possible to avoid creating holes/openings in the freezer 162 to incorporate fluid lines, thereby avoiding irreversible damage to the freezer 162. Instead, the rack apparatus 170 presents a non-damaging, non-permanent way of converting freezers into cooling chambers 160 for extraction loop components.

It is contemplated that channels like channel 184 be fluidly connected to an inert gas cannister 80 and utilized to release inert gas into the interior of the cooling chamber 160 (e.g., through opening 180 shown in FIG. 12). Doing so may purge said interior of oxygen, which may be helpful if, for example, flammable solvents are being used in the extraction process (e.g., hydrocarbons).

The rack apparatus 170 does not need to be limited to any particular material composition. However, it is contemplated that the material used to fabricate rack apparatus 170 should exhibit sufficient strength and rigidity to adequately support the weight of the extraction components; and ideally should be nonreactive with the fluids that flow through the rack apparatus 170. It is contemplated that stainless steel tubing, such as ½ inch square stainless-steel tubing, may be preferred for the fabrication of some, if not all, of the rack apparatus 170.

Figure 14:
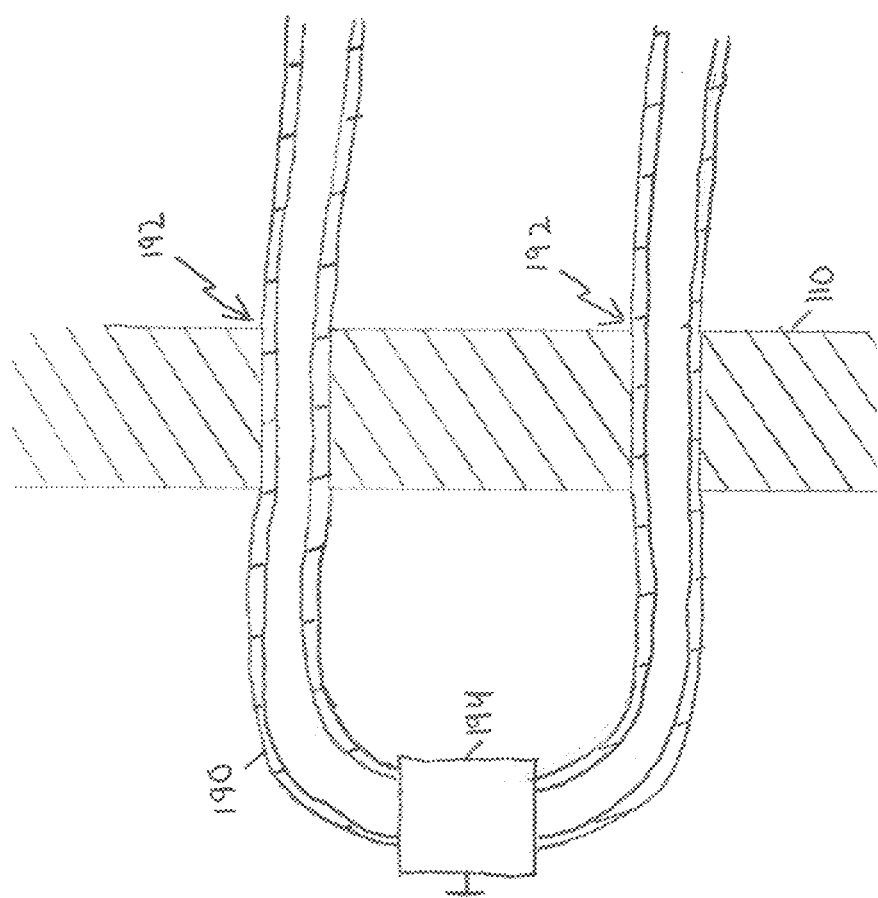
FIG. 14 is a cross-sectional view of a portion of a cooling chamber showing an external loop fluid line configuration.

Referring to FIG. 14, a fluid line configuration is shown. Here, a fluid line 190 is connected to two channels 192 that extend across the cooling chamber 110 (e.g., across cooling chamber body 142 or rack apparatus 170). This creates an "external loop" wherein fluid from within the cooling chamber 110 can be directed out of the cooling chamber 110 and then redirected back in. This configuration allows for valves to be incorporated (shown schematically by ref. no. 194), which serve as additional points of control for the user. These valves may be utilized to open, close, and/or adjust fluid lines. For example, the extraction system of FIG. 3 shows two external loops that each incorporate a valve. Closing valve 14 may enable the user to load carrier material into the extraction vessel 20 without solvent flowing in. And closing both valves 14 and 24 can isolate the extraction vessel 20 from the rest of the extraction loop, which may be useful for retaining solvent in the extraction vessel 20 to soak the carrier material. Examples of valves that may be suitable include, but is not limited to, ball valves, butterfly valves, gate valves, globe valves, plug valves, check valves, and the like.

Figure 15:
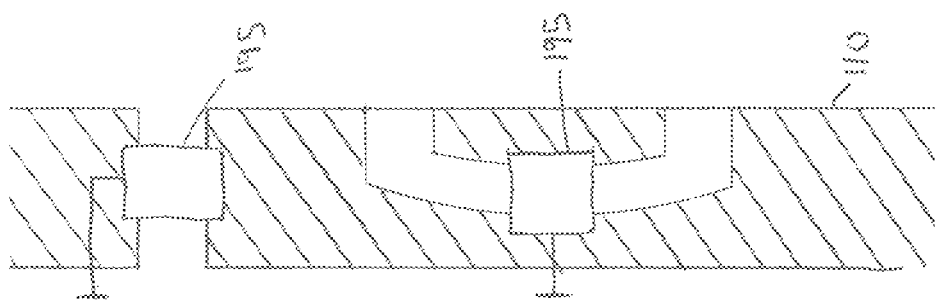
FIG. 15 is a cross-sectional view of a portion of a cooling chamber showing valves integrated into the cooling chamber body.

Referring to FIG. 15, it is shown that valves 195 may be installed directly into the cooling chamber 110 (e.g., cooling chamber body 142 or rack apparatus 170) and incorporated into a channel. Doing so may negate the need for external loops. In any case, it is contemplated that the concepts shown in FIGS. 14 and 15 can be utilized to incorporate valves into any fluid line along the extraction loop.

Figure 16:
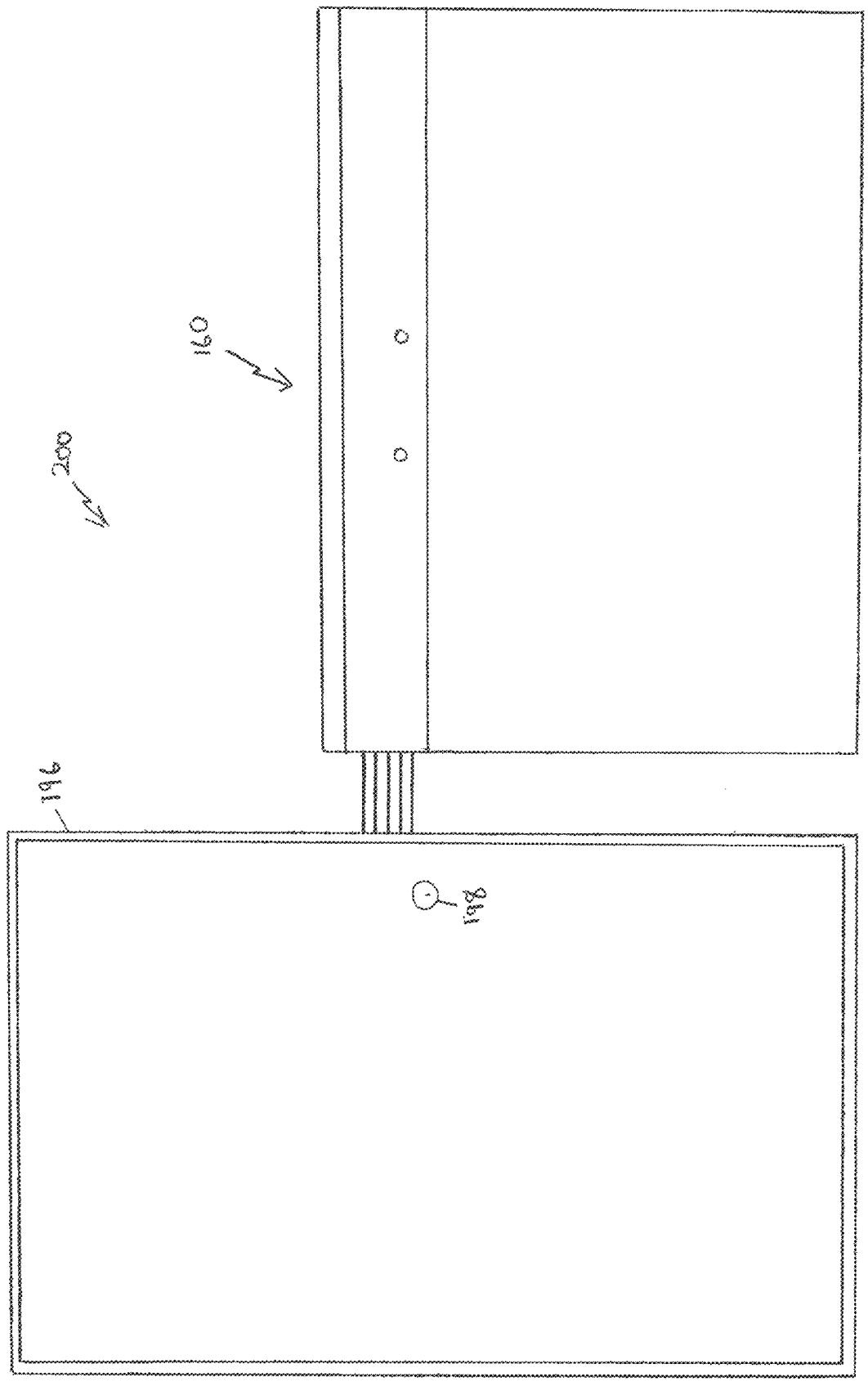
FIG. 16 is a front view of the extraction system of FIG. 3 further incorporating a secured enclosure.

Referring to FIG. 16, it is shown that the extraction system 200 may further include secured enclosure 196. Secured enclosure 196 may be provided to house one or more components of the closed loop extraction system 200, namely, those not stored within the cooling chamber 110. For example, it is contemplated that the purge vessel 40, the recover pump 90, and/or the manifold 70 may be housed within this secured enclosure 196. Heating element 50 can also be housed therein, or alternatively mounted to the side of it. Particularly in regards to the purge vessel 40, those skilled in the art will appreciate that in many cases the extract deposited in the purge vessel 40 may be highly valuable and thus subject to theft. A primary function of the secured enclosure 196 may be to prevent theft of this extract by securely storing the purge vessel 40 within. Accordingly, locking features 198 such as a cam locks, padlocks, deadbolts, biometric security systems, combinations thereof, and/or the like may also be provided on the secured enclosure 196 to prevent unpermitted access (FIG. 11). Further, while the secured enclosure 196 may be custom fabricated, it is also contemplated that a secured enclosure 196 may be fashioned from existing secured enclosures such as commercially available vaults and safes.

The fact that the entire extraction system 200 can be entirely enclosed within the secured enclosure 196 and the cooling chamber 110 makes the overall system easier to maneuver and transport. Further, it is contemplated that enclosing the entire system may have safety implications as well. Those skilled in the art will appreciate that since solvent extraction systems can be dangerous and often utilize hazardous materials, the ability to operate these solvent extraction systems will often be predicated on compliance with the relevant safety regulations. For example, Article 500 of the National Electric Code, which is administered by the National Fire Protection Association, provides an area classification system that many companies and municipalities in the United States adhere to. Specifically, compliance with Class 1, Division 1 (i.e., "C1D1") of Article 500 can be a primary factor in determining whether or not an extraction operation will be granted operating licensure. Since the extraction loop components of FIG. 3 can essentially be entirely enclosed within the cooling chamber 110 and the secured enclosure 196, it is contemplated this extraction system 200 may achieve C1D1 compliance or even negate the applicability of C1D1. Accordingly, it is also contemplated that the secured enclosure 196 and/or the cooling chamber 110, preferably both, may feature a sturdy, blast- and/or flame-proof construction (e.g., metal, rigid plastic, etc.) such that the secured enclosure 196 and/or the cooling chamber 110 may, in effect, contain/trap/stifle fires and/or explosions should one occur.

A method of extracting organic compounds from dry *cannabis* plant matter using the extraction system 300 of FIG. 3 with the cooling chamber 160 of FIG. 8 will now be described. The process begins by first loading a quantity of dried *cannabis* plant matter into the extraction vessel 20. For example, approximately 900 grams to about 2,700 grams, but preferably about 1,800 grams, may be appropriate. The extraction vessel 20 may then be sealed and connected to the rack apparatus 170 to provide a fluid connection to the solvent reservoir 10 and the clarification vessel 30. Internal temperature within the cooling chamber 160 may be maintained at about −30° F. to about −50° F., but preferably about −40° F.

Nitrogen gas may then be used to purge the interior of the cooling chamber 160. A 70/30 solvent mixture of butane and propane (preferably substantially devoid of any impurities and/or additives such as mercaptans) may then be transferred to the extraction vessel 20 from the solvent reservoir 10 to initiate the solid-liquid extraction of organic compounds from the plant matter (e.g., cannabinoids, terpenoids, and phenolic compounds). One example of a suitable butane may include R600a isobutane (also known as CARE 10). Reaction times for this extraction operation may range from about 1 second to about 5 seconds. Manifold 70 may also be actuated to maintain an internal pressure of about −27 Hg to about −30 Hg, but preferably about −29 Hg, within the closed extraction loop.

Fluid extract may then be transferred to the clarification vessel 30 for the removal of undesired compounds such as chlorophyll and/or pesticides. Here, the clarification vessel 30 may contain a quantity of filtering medium such as silica, alumina, charcoal, and/or the like. Additionally, the fluid extract may also be filtered through a vapor straw (e.g., such as the Vapor Vessel available from Pulsar Vaporizers of Asheville, North Carolina) at ambient temperature also filled with any of the previously mentioned filtering mediums. To facilitate fluid extract transfer, manifold 70 may be actuated to apply a stream of nitrogen gas at a pressure of 20 psi.

Remaining extract is then transferred to the purge vessel 40 while heater fluid having a temperature of about 70° F. to about 90° F., but preferably about 80° F., is circulated through the purge vessel 40. Doing so initiates a liquid-to-gas phase transition of the solvent mixture. During this time, recovery pump 90 may also be actuated to apply a vacuum pressure of about −27 Hg to about −30 Hg, but preferably about −29 Hg. Purge conditions may be maintained for a timeframe of about 5 minutes to about 30 minutes, but preferably about 10 minutes. The remaining solvent is returned to the solvent reservoir 110, thereby concluding the method.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An extraction system comprising:
 a cooling chamber comprising a body, a lid, and an interior defined therebetween, wherein the cooling chamber body defines a channel that extends from the interior of the cooling chamber to the exterior of the cooling chamber;
 a fluid line incorporated into the channel defined in the cooling chamber body; and
 a closed extraction loop comprising:
  a first extraction loop component located within the interior of the cooling chamber;
  a second extraction loop component located exterior to the cooling chamber;
  an inert gas cannister located within the interior of the cooling chamber; and
  a manifold in fluid communication with the inert gas cannister;
 wherein the manifold is configured to introduce inert gas into the closed extraction loop; and
 wherein the fluid line is fluidly connected to the first extraction loop component and the second extraction loop component and enables fluid transfer between them.

2. The extraction system of claim 1, wherein the first extraction loop component is an extraction vessel.

3. The extraction system of claim 1, wherein the first extraction loop component is a clarification vessel.

4. The extraction system of claim 1, wherein the second extraction loop component is a purge vessel.

5. The extraction vessel of claim 4 further comprising a heating element configured to apply heat to the purge vessel.

6. The extraction system of claim 1, wherein the closed extraction loop further comprises a solvent reservoir in fluid communication with the first extraction loop component.

7. The extraction system of claim 6, wherein the solvent reservoir is located within the interior of the cooling chamber.

8. The extraction system of claim 1 further comprising a molecular sieve in fluid communication with the second extraction loop component.

9. The extraction system of claim 1 further comprising a recovery pump in fluid communication with the manifold.

10. The extraction system of claim 1, wherein the extraction loop further comprises a thermostat configured to detect the temperature of fluid within the extraction loop that is exterior to the cooling chamber and prevent or limit the fluid from entering the cooling chamber if its temperature exceeds a predetermined temperature threshold.

11. An extraction system comprising:
 a cooling chamber comprising a freezer and a rack apparatus, wherein:
  the freezer comprises a body, a lid, and an interior space defined therebetween;
  the rack apparatus is inserted into the interior space of the freezer; and
  the rack apparatus defines a channel that extends from the interior space of the freezer to the exterior of the freezer;
 a fluid line incorporated into the channel defined in the rack apparatus; and
 a closed extraction loop comprising:
  a first extraction loop component located within the interior of the cooling chamber; and
  a second extraction loop component located exterior to the cooling chamber;
 wherein the fluid line is fluidly connected to the first extraction loop component and the second extraction loop component and enables fluid transfer between them.

12. The extraction system of claim 11, wherein:
 the freezer is a chest freezer comprising a body that defines an upper lip;
 the rack apparatus comprises an upper rim that closely matches the size and shape of the upper lip; and
 the upper rim rests upon the upper lip when the rack apparatus is inserted into the interior space of the freezer.

13. The extraction system of claim 11, wherein:
 the rack apparatus further comprises a rack portion; and
 the first extraction loop component is attached to the rack portion.

14. An extraction system comprising:
 a cooling chamber comprising a body, a lid, and an interior defined therebetween, wherein the cooling chamber body defines a channel that extends from the interior of the cooling chamber to the exterior of the cooling chamber;
 a fluid line incorporated into the channel defined in the cooling chamber body; and
 a closed extraction loop comprising:
  an extraction vessel located within the interior of the cooling chamber;
  a clarification vessel located within the interior of the cooling chamber;
  a purge vessel located exterior to the cooling chamber;
  an inert gas cannister located within the interior of the cooling chamber; and
  a manifold in fluid communication with the inert gas cannister;
 wherein the manifold is configured to introduce inert gas into the closed extraction loop; and
 wherein the fluid line is fluidly connected to the clarification vessel and the purge vessel and enables fluid transfer between them.

15. The extraction system of claim 14, wherein:
 the extraction vessel comprises a fluid inlet and a fluid outlet;
 the extraction loop further comprises a first valve positioned proximate the fluid inlet of the extraction vessel and a second valve positioned proximate the fluid outlet of the extraction vessel; and
 the first and second valves, when closed, enable the extraction vessel to hold a quantity of fluid within it.

16. The extraction system of claim 14 further comprising a secured enclosure, wherein the purge vessel is located within the secured enclosure.

* * * * *